(12) United States Patent
Rothschild

(10) Patent No.: US 8,798,640 B2
(45) Date of Patent: Aug. 5, 2014

(54) LOCATION BASED DATA ACQUISITION

(76) Inventor: Leigh M. Rothschild, Sunny Isles Beach, FL (US)

(*) Notice: Subject to any disclaimer, the term of this patent is extended or adjusted under 35 U.S.C. 154(b) by 538 days.

(21) Appl. No.: 12/909,290

(22) Filed: Oct. 21, 2010

(65) Prior Publication Data

US 2011/0034184 A1 Feb. 10, 2011

Related U.S. Application Data

(63) Continuation of application No. 12/772,987, filed on May 3, 2010.

(60) Provisional application No. 61/174,777, filed on May 1, 2009, provisional application No. 61/174,766, filed on May 1, 2009.

(51) Int. Cl.
| | |
|---|---|
| H04W 24/00 | (2009.01) |
| H04W 4/02 | (2009.01) |
| H04W 4/04 | (2009.01) |
| H04M 3/42 | (2006.01) |
| H04L 29/08 | (2006.01) |

(52) U.S. Cl.
CPC . *H04W 4/02* (2013.01); *H04W 4/04* (2013.01); *H04M 3/4234* (2013.01); *H04M 2242/15* (2013.01); *H04L 67/02* (2013.01)
USPC ....... 455/456.1; 455/420; 455/13.1; 370/310; 348/61

(58) Field of Classification Search
CPC ....... H04W 4/02; H04W 4/04; H04M 3/4234; H04M 2242/15; H04L 67/02
USPC ............ 455/90.1, 414.1, 414.3, 456.1, 456.2, 455/456.3, 456.6, 457, 428, 433, 439, 13.1, 455/420; 340/988, 991; 370/335, 310; 342/450, 457, 357.62; 348/61, 116, 348/118
See application file for complete search history.

(56) References Cited

U.S. PATENT DOCUMENTS

| | | | |
|---|---|---|---|
| 7,010,267 B2* | 3/2006 | Vanluijt et al. | 455/41.2 |
| 7,386,318 B2* | 6/2008 | Moon et al. | 455/456.3 |
| 7,720,436 B2* | 5/2010 | Hamynen et al. | 455/13.1 |
| 8,401,003 B1* | 3/2013 | Petit-Huguenin et al. | 370/352 |
| 2002/0164952 A1* | 11/2002 | Singhal et al. | 455/41 |
| 2003/0013459 A1* | 1/2003 | Rankin et al. | 455/456 |
| 2004/0213409 A1* | 10/2004 | Murto et al. | 380/258 |
| 2004/0252197 A1* | 12/2004 | Fraley et al. | 348/207.1 |
| 2005/0228860 A1* | 10/2005 | Hamynen et al. | 709/203 |
| 2006/0206586 A1* | 9/2006 | Ling et al. | 709/219 |
| 2008/0144549 A1* | 6/2008 | Marques | 370/310 |
| 2008/0162037 A1* | 7/2008 | Hasan Mahmoud | 701/208 |
| 2009/0094649 A1* | 4/2009 | Patel | 725/86 |
| 2009/0171568 A1* | 7/2009 | McQuaide, Jr. | 701/206 |
| 2009/0197620 A1* | 8/2009 | Choi et al. | 455/456.3 |
| 2010/0099396 A1* | 4/2010 | Huq et al. | 455/420 |
| 2010/0123737 A1* | 5/2010 | Williamson et al. | 345/672 |
| 2010/0214398 A1* | 8/2010 | Goulart et al. | 348/61 |

* cited by examiner

*Primary Examiner* — Mahendra Patel

(74) *Attorney, Agent, or Firm* — Atanu Das; Techlaw LLP

(57) ABSTRACT

A method, apparatus, and system for providing information related to a geographic location of a user of a mobile device are disclosed. In some embodiments, a location of the mobile device is determined. Information related to the location is also determined. The related information is provided to a user of the mobile device via the mobile device. In some embodiments, an image sensor nearby the mobile device is identified and an image captured by the image sensor is displayed via the mobile device. In some embodiments, the mobile device can be used to control the direction, focus, and aperture of the image sensor.

18 Claims, 5 Drawing Sheets

LOCATION BASED DATA ACQUISITION

CROSS-REFERENCE TO RELATED APPLICATION

This application is a continuation of patent application Ser. No. 12/772,987, filed May 3, 2010, entitled LOCATION BASED IMAGE ACQUISITION, which claims priority to U.S. Provisional Application Ser. Nos. 61/174,777 and 61/174,766 both filed May 1, 2009, the entirety of all of which are incorporated herein by reference.

STATEMENT REGARDING FEDERALLY SPONSORED RESEARCH OR DEVELOPMENT n/a

FIELD OF THE INVENTION

The present invention relates to a method and system of communicating with a mobile device, and more particularly to a method and system of providing geographic-related information to a user of a mobile device.

BACKGROUND OF THE INVENTION

Global Positioning System (GPS) devices and other position-determining devices have become quite prevalent. In addition to stand-alone devices for automobiles, boats and airplanes, they are found in mobile devices such as mobile phones and personal digital assistants, as well as in other consumer electronic devices. These devices are useful for locating geographic locations and in providing route information from a first location to a destination location. The rise of GPS and position information device (PID) technology has resulted in the specialization of computing to account for the location of a computing device; namely, location based computing.

These devices also provide digital information in the form of video, audio, and text data. The data may be stored in files such as word processing files, pdf files, MPEG files, Quicktime files, photo files such as jpg, bmp, tif, and dib files, etc. The data currently provided to a mobile device is generally independent of a location of the mobile device. A need therefore exists to enable a user of a mobile device to access information that is related to the user's location and to notify the user of the availability of such related information.

SUMMARY OF THE INVENTION

The present invention advantageously provides a method and system for providing information related to a geographic location of a user of a mobile device. According to one aspect, the invention provides a method that includes determining a location of the mobile device, determining links to information concerning sites proximate the location of the mobile device, and providing at least one of the links and data corresponding to the links to the user via the mobile device. In some embodiments, the method further comprises showing an image captured by a nearby sensor on a display of the mobile device.

According to another aspect, the invention provides a mobile device for controlling a device proximate a geographic location of a user of the mobile device. The mobile device includes a positioning determining device to determine a position of the mobile device. The mobile device also includes a memory for storing information related to the determined position. The mobile device further includes a processor in communication with the position determining device and the memory. The processor controls a nearby device proximate the position of the mobile device.

According to another aspect, the invention provides a server for providing information related to a geographic location of a user of a mobile device. The server includes a memory to store location-specific information organized by location. The server also includes a receiver to receive a location of a mobile device from the mobile device. The server also includes a processor in communication with the memory and the receiver. The processor is to access the location-specific information that is specific to the received location. The server also includes a transmitter in communication with the processor to transmit the location-specific information to the mobile device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
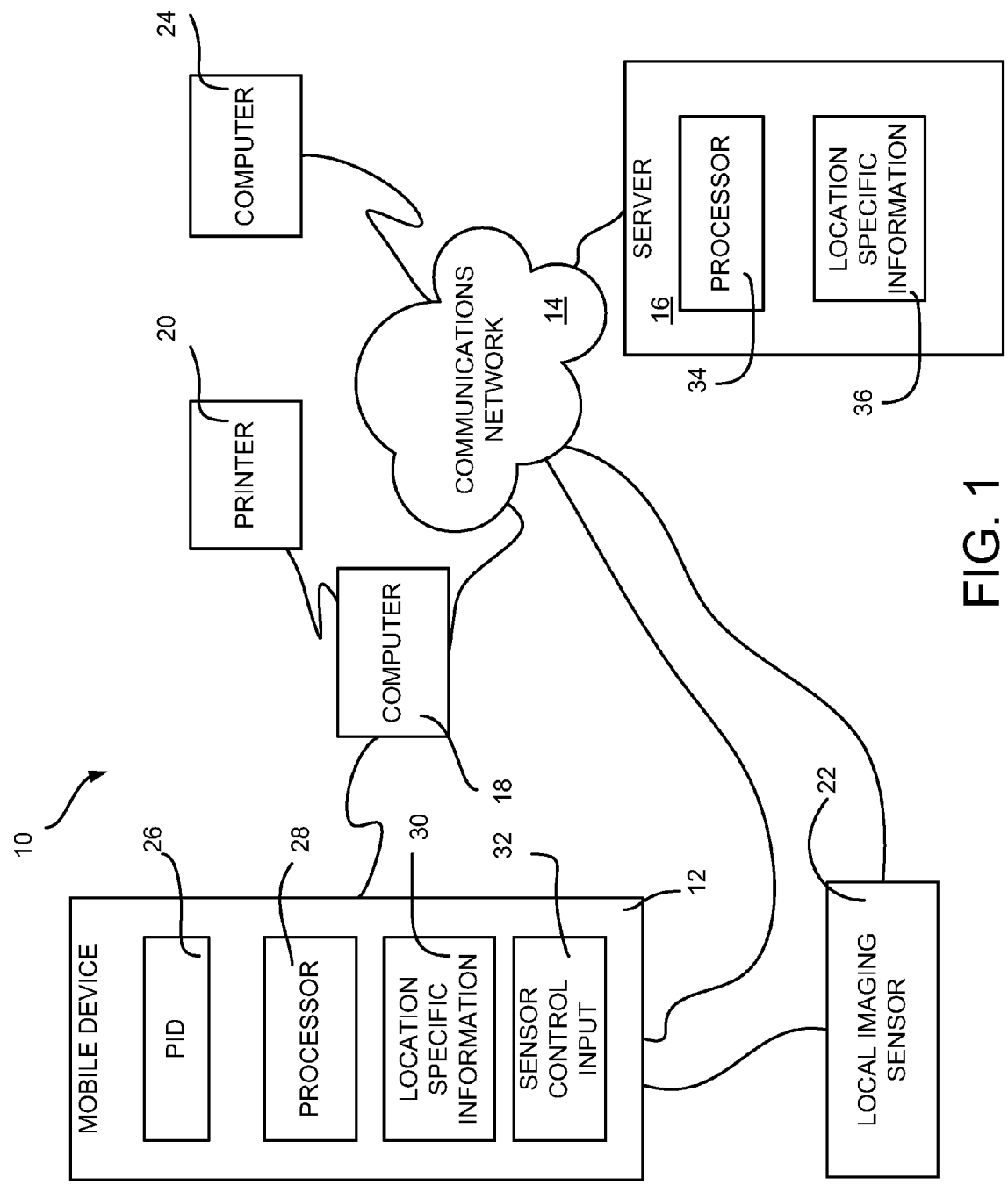
FIG. 1 is a network for providing information related to a position of a mobile device in a communication network constructed according to principles of the present invention.

Before describing in detail exemplary embodiments that are in accordance with the present invention, it is noted that the embodiments reside primarily in combinations of apparatus components and processing steps related to implementing a system and method for acquiring and communicating location-specific information. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which like reference designators refer to like elements, there is shown in FIG. 1 a block diagram of an exemplary system constructed in accordance with principles of the present invention, and generally designated as "10". The system 10 is a network for providing information related to a position of a mobile device. A mobile device 12 is communicatively coupled to a communication network 14 which is communicatively coupled to a server 16. The mobile device 12 may be coupled to the communication network 14 wirelessly or by wire or optical fiber. For example, the mobile device may communicate with the communication network using Orthogonal Frequency Division Multiplex (OFDM), Code Division Multiple Access (CDMA), WiFI, WiMax, or other wireless LAN and/or cellular technology. The mobile device may be a mobile phone, a personal digital assistant, a laptop computer, or other mobile device with or without internal memory.

The communication network 14 may include a cellular communication network and the Public Switched Telephone Network (PSTN), or other wide area network (WAN), such as the Internet, as well as local area networks (LAN), such as an Ethernet LAN. The mobile device 12 may also be communicatively coupled to a computer 18 wirelessly, by wire, by optical fiber and/or via the communication network 14. The computer 18 may be communicatively coupled to a printer 20. The computer 18 is also communicatively coupled to the communication network 14 and may have internal memory.

Further, the mobile device 12 may be communicatively coupled to a local imaging sensor 22. The imaging sensor 22 may be communicatively coupled to the communication network 14. The system 10 may include other computers 24 communicatively coupled to the communication network 14 either wirelessly or by wire or optical fiber. In one embodiment, the mobile device may be used to control a direction or focus of the local imaging sensor 22.

The mobile device 12 includes a positioning information device (PID) 26 such as a GPS receiver to determine position of the mobile device 12. Optionally, the position of the mobile device can be determined remotely, such as at a base station, and communicated to the mobile device.

The mobile device also includes a processor 28, a location specific information store 30 and a mechanism for generating control signals 32 to control the local imaging sensor 22. The location of a nearby image sensor 22 may be determined from a database of the server 16. The mobile device 12 may be enabled to cause the imaging sensor 22 to pan, tilt, zoom, focus, or change aperture. Also, the server may automatically redirect the image sensor to turn to the mobile device and zoom in on the mobile device. The mobile device 12 may also control a thermal or infrared imaging feature of the imaging sensor 22. The imaging sensor 22 is equipped with a communications module that enables data communication between the image sensor and the mobile device 12 and/or the communication network 14 either by wire or wirelessly, and directly by line of sight or indirectly by satellite communications. As the mobile device 12 moves, a new nearest image sensor is determined and images from the new sensor are sent to the mobile device 12.

The mobile device 12 may transmit its identity to the server 16 which correlates the identity to a home computer 18 of the mobile device user. Data related to the location of the mobile device 12, and/or image data captured by a nearby image sensor 22 can be forwarded to the computer 18 by the server 16. Thus, a large quantity of information related to the location of the mobile device 12 can later be accessed by the user without requiring a large amount of memory of the mobile device. The server 16 may be one server or multiple servers individually owned by the individual vendors that are providing the related information.

The server 16 has a processor 34 and a location-specific information store 36. The location specific-information store 36 may be a database controlled by software such as ORACLE, MICROSOFT SERVER, MY SQL, etc. The server stores location-specific information including links to websites related to the location of the mobile device, such as a link to a nearby dining establishment, retail establishment, entertainment establishment, museum, park or other site based on user preferences. The location-specific information may include a video file, an audio file, a text file, and/or a multimedia file. The location-specific information store 36 may be organized according to location and indexed based on location coordinates.

In operation, the PID 26 of the mobile device 12 may continually determine the current position of the mobile device 12 that is carried by a user in motion, such as a user walking through a park or a shopping mall or driving a car, boat or plane, for example. The current position of the mobile device 12 may be transmitted to the computer 18 and/or to the server 16 via the communication network 14. The server 16 or the computer 18 may store information organized according to locations to which the information relates. Thus, for example, the location specific information store 36 may store links (such as Uniform Resource Locators (URLs)) to websites having information that relates to the position of the mobile device 12 or that relates to a position nearby the mobile device 12. The processor 34 of the server 16 therefore looks up location specific links in the location specific information store 36 based on the position information received from the PID 26 of the mobile device 12. The server 16 may then transmit the location specific links to the mobile device 12 via the communication network 14. The server 16 may also download user-readable material such as an e-brochure concerning a location.

The mobile device 12 may display the location specific information on a display of the mobile device 12. The location specific information may include video, audio, text, or multimedia information concerning the location of the mobile device 12 or a location nearby the mobile device 12. The location specific information may include a link to a website related to the location or a nearby location. In one embodiment, the user of the mobile device 12 may input a category or preference such as "dining establishment," "museum," "historical site," or "park," using a keypad or touch sensitive screen of the mobile device 12 or by voice command. The category may be sent to the server 16 via the communication network 14, which looks up location specific links based on the category and based on the location of the mobile device 12. For example, if the user-selected category is "museum," and the mobile device approaches the vicinity of a museum, information concerning that museum may be retrieved from the location specific information store 36. This information concerning the particular nearby museum may be received by the mobile device 12 and stored in the location specific information store 30 of the mobile device 12, and may be displayed by the mobile device.

The location specific information store 36 of the server 16 may include a table of locations and links to websites associated with the locations along with associated longitude and latitude coordinates of each location. This information may be compiled in advance and provided as a service to which the user may subscribe either for free or the user may subscribe via an e-commerce transaction.

Thus, one embodiment is a mobile device 12 that provides information related to a geographic location of a user of the mobile device. The mobile device 12 includes a position determining device to determine the position of the mobile device. The mobile device has a memory to store information 30 related to the determined position, and a processor 28 to access the information 30 related to the determined position. In response to determining position, the processor 28 may activate or control a nearby device. For example, the processor 28 may control a nearby sensor or a nearby device including a remote server that activates a video file, an audio file, a text file or a multimedia file having information related to the determined position. In some embodiments the nearby device is activated when the mobile device moves into proximity of the nearby device. The processor 28 may also determine that the apparatus is within a predetermined distance to a particular location based on a preference expressed by a user of the mobile device. In one embodiment, the mobile device includes a wireless transceiver for receiving the position-related information.

Another embodiment is a server 16 for providing information 36 related to a geographic location of a user of a mobile device 12. The server 16 has a memory to store location-specific information 36 organized by location. The server 16 has a receiver to receive the location of the mobile device from the mobile device. A processor of the server accesses location-specific information based on the received location. The server 16 also has a transmitter to transmit the location-specific information to the mobile device. The location-specific information may include a video file, an audio file, a text file, a multimedia file and/or a link to a website.

For example, a user may be in a shopping mall and browsing stores on the user's mobile device. As a user passes a store, the user may receive a notification from the mobile device that the store is having a promotional on certain merchandise. The user may select a link provided in the notification, and navigate to a webpage of information concerning the merchandise.

As another example, a user may indicate that he or she is interested in museums. This information may be stored at his or her mobile phone and may also be transmitted to a location information server. Suppose that the user is driving nearby a museum. Responsive to coming into proximity of the museum, the user's mobile device will issue a notification that the museum is nearby. The user may select a link displayed on his mobile device that retrieves information concerning the museum.

As another example, a user of a mobile device may be strolling through a park and encounter a particular flower. The user may access a website that has information on plants and animals indigenous to the location of the user. The user may search images at the website to find an image and description of the particular flower the user has found.

As another example, a user of a mobile device with a PID may be in a particular dining establishment and wish to access music, audio files, printed material or a video that the dining establishment has chosen. For example, a menu may be displayed and accompanied by music the dining establishment has selected for the user's relaxation. The user may select items from the menu using the mobile device and these selections may be received by a remote server affiliated with the dining establishment. The user can also request the information concerning the restaurant to be transferred to a selected remote server such as the user's home or office computer, to allow the user to access the information at a later time. Also, the information may be stored locally in a memory of the mobile device.

Figure 2:
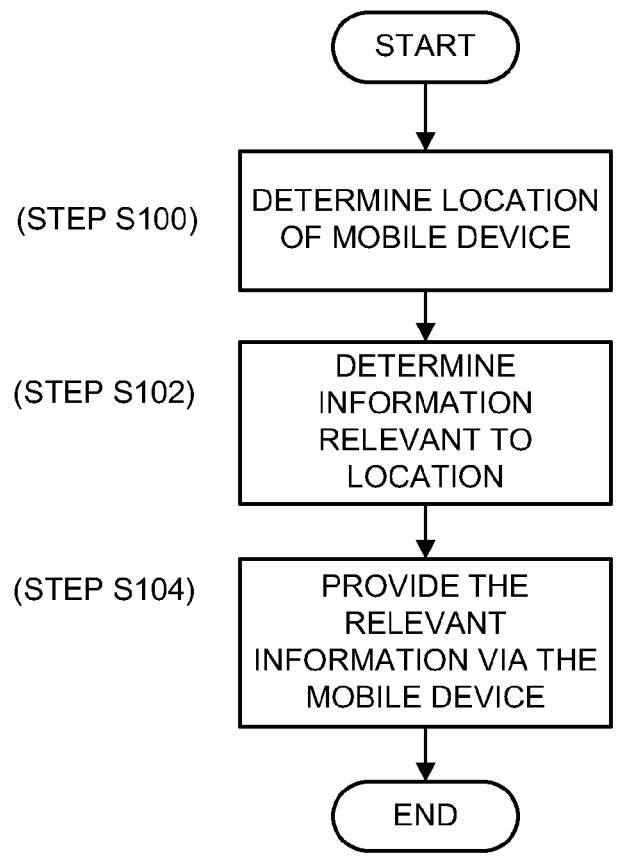
FIG. 2 is a flow chart of an exemplary method for providing information related to the location of a mobile device according to the principles of the present invention.

FIG. 2 is a flow chart of an exemplary process for providing information to a mobile device that is related to a location of the mobile device. A location of the mobile device is determined (Step S100). Based on the location, information related to the location is determined (Step S102). The determined related information is provided to the mobile device (Step S104.).

Figure 3:
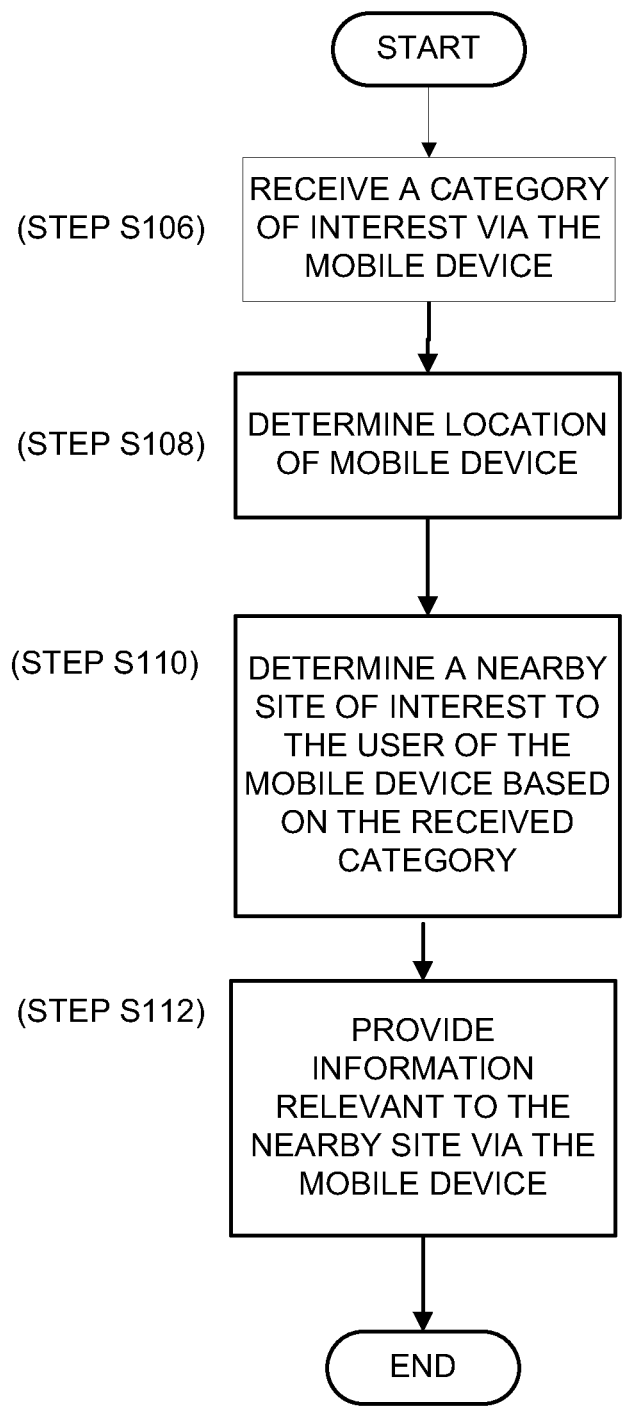
FIG. 3 is a flow chart of an exemplary method of providing information related to a site nearby a mobile device based on a category of interest specified by a user, according to principles of the present invention.

FIG. 3 is a flow chart of an exemplary process for providing information to a mobile device that is related to a location of the mobile device, based on a category of interest expressed by a user of the mobile device. A category of interest or preference, such as "dining establishment" or "museum," is received from the user via the mobile device (Step S106). The location of the mobile device is continually determined (Step S108). A site of interest that is in the category of interest expressed by the use is determined when such a site is nearby the mobile device (Step S110). Information related to the nearby site of interest is provided via the mobile device (Step S112).

Figure 4:
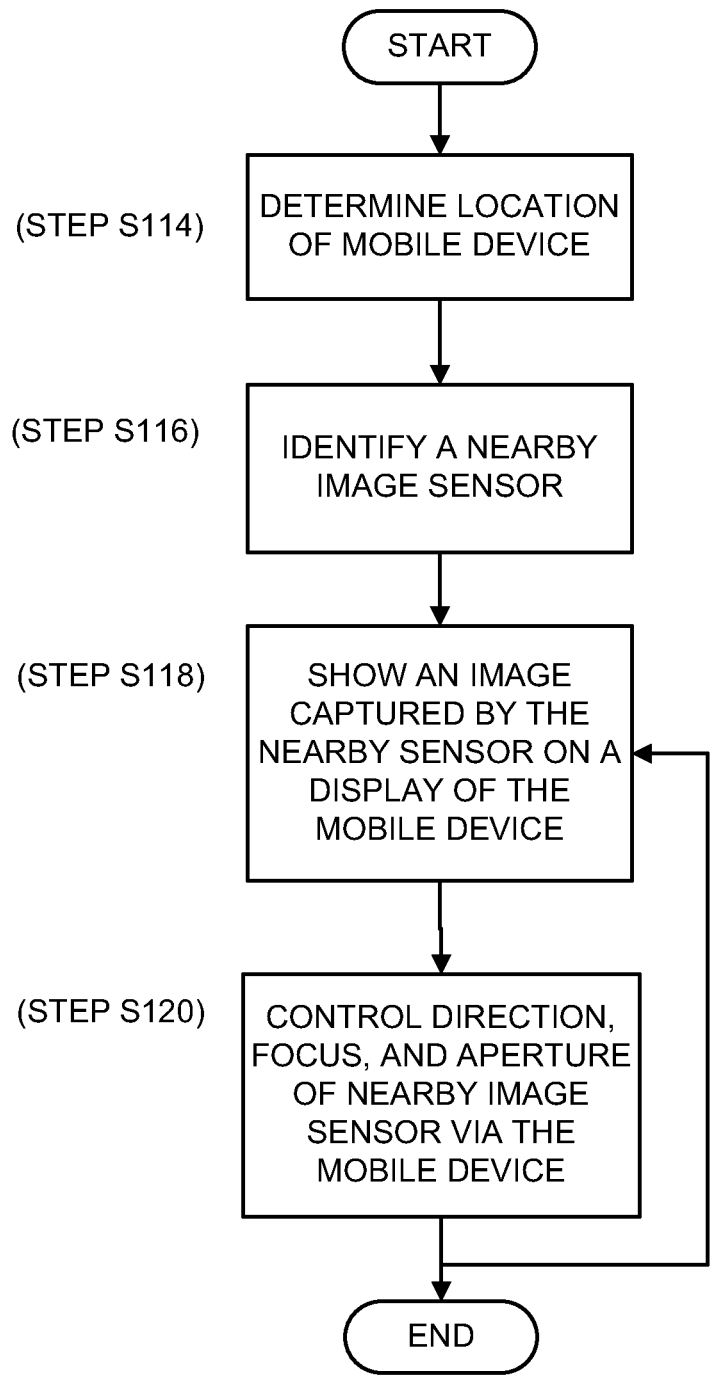
FIG. 4 is a flow chart of an exemplary method for determining and controlling an image sensor nearby a mobile device according to the principles of the present invention.

FIG. 4 is a flow chart of an exemplary process for enabling a mobile device to control a nearby image sensor. The location of the mobile device is determined (Step S114). An image sensor located nearby the mobile device is identified (Step S116). An image captured by the nearby image sensor is displayed on a display of the mobile device (Step S118). Using a control mechanism of the mobile device, such as arrow buttons, the user may control the direction (pan, tilt), focus (zoom), and aperture of the nearby image sensor (Step S120). The sensor may then capture a new image that is shown by a display of the mobile device (Step S118).

Figure 5:
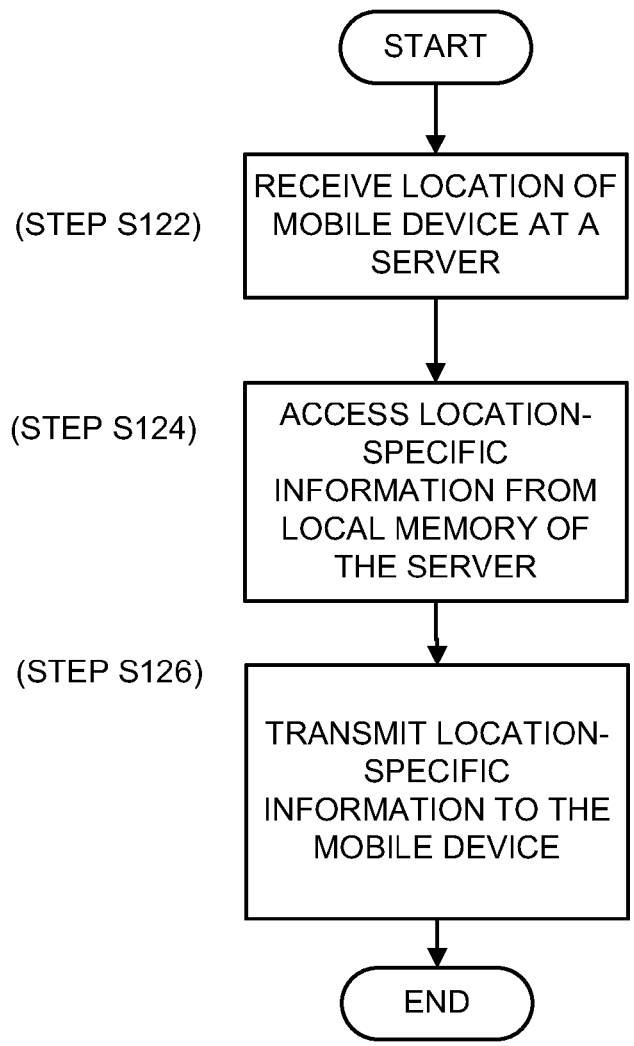
FIG. 5 is a flow chart of an exemplary method for accessing location-specific information at a server according to principles of the present invention.

FIG. 5 is a flow chart of an exemplary process for providing location-specific information to a mobile device. A location of a mobile device is received at a server (Step S122). The server accesses location-specific information from a local memory of the server (Step S124). The accessed location-specific information is transmitted by the server to the mobile device (Step S126).

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of providing information related to a geographic location of a user of a mobile device, the method comprising:
   determining a location by the mobile device;
   receiving, by the computer server, a category selection based on user input;
   determining, by the computer server, links to information concerning sites proximate the location based on the selected category; and
   causing to display, by the computer server, at least one of the links and data corresponding to the links to the user via the mobile device;
   causing to show by the computer server an image captured by an image sensor proximate the location of the mobile device on a display of the mobile device;
   remotely controlling the image sensor via the mobile device and the computer server that receives the location of the mobile device;
   wherein the information concerning sites proximate the location includes at least one of video information, audio information, text information, and a hyperlink to a website concerning the location.

2. The method of claim 1, further comprising showing an image captured by an image sensor proximate the location of the mobile device on a display of the mobile device.

3. The method of claim 2, further comprising remotely controlling the image sensor via the mobile device.

4. The method of claim 2, further comprising remotely controlling the image sensor via a server that receives the location of the mobile device.

5. The method of claim 4, wherein the information concerning sites proximate the location includes at least one of video information, audio information, text information, and a hyperlink to a website concerning the location.

6. The method of claim 1, wherein the information concerning sites proximate the location includes information concerning one of a historical site, a museum, an art gallery, a retail establishment, a dining establishment, and an entertainment establishment.

7. The method of claim 1, wherein the information concerning sites proximate the location includes information concerning species indigenous to the location.

8. The method of claim 1, wherein the information concerning sites proximate the location includes user readable material, the user readable material including a downloadable brochure.

9. The method of claim 6, wherein the information concerning the dining establishment includes music selected by dining establishment personnel.

10. The method of claim 1, further comprising transferring, by the mobile device, the information concerning sites proximate the location to a remote computer.

11. A server for providing information related to a remote geographic location of a user of a mobile device, the server comprising:
    a memory, the memory:
       storing location-specific information organized by location and by category; and
       storing a location of at least one image sensor controllable by the mobile device;
    a receiver, the receiver:
       receiving a location of the mobile device from the mobile device; and
       receiving a category from the mobile device based on user input;
       receiving image data from an image sensor proximate the location of the mobile device;
    a processor in communication with the memory and the receiver, the processor accessing the location-specific information, the location-specific information based on the received category; and
    providing instructions to show an image captured by an image sensor proximate the location of the mobile device on a display of the mobile device;
    remotely controlling the image sensor that receives the location of the mobile device;
    wherein the information concerning sites proximate the location includes at least one of video information, audio information, text information, and a hyperlink to a website concerning the location;
    a transmitter in communication with the processor, the transmitter transmitting the location-specific information to the mobile device.

12. The server of claim 11, wherein the location-specific information includes at least one of a video file, an audio file, a text file, a multimedia file and a link to a website.

13. The server of claim 12, wherein the server communicates the location-specific information to a computer of the user.

14. The method of claim 2, further comprising automatically redirecting the image sensor to turn to the mobile device.

15. The method of claim 14, further comprising causing the image sensor to zoom in on the mobile device.

16. The method of claim 2, further comprising controlling an imaging feature of the image sensor, the imaging feature being one of a thermal imaging feature and an infrared imaging feature.

17. The method of claim 2, further comprising transmitting information gathered by the mobile device to a central computer in real time for later analysis.

18. The method of claim 2, wherein determining a location of the mobile device includes sensing a presence of the mobile device.

* * * * *